United States Patent [19]
Schreiber

[11] Patent Number: 5,311,543
[45] Date of Patent: May 10, 1994

[54] TELEVISION TRANSMISSION SYSTEM USING TWO STAGES OF SPEAD-SPECTRUM PROCESSING

[76] Inventor: William F. Schreiber, No. 8 Ellery Sq., Cambridge, Mass. 02138

[21] Appl. No.: 965,227

[22] Filed: Oct. 23, 1992

[51] Int. Cl.$^5$ .............................................. H04N 7/167
[52] U.S. Cl. ........................................... 375/1; 380/10; 380/13; 380/19; 380/20
[58] Field of Search ................. 375/1; 380/10, 13, 19, 380/20

[56] References Cited

U.S. PATENT DOCUMENTS

| | | | |
|---|---|---|---|
| 4,425,642 | 1/1984 | Moses et al. | 375/1 |
| 4,821,120 | 4/1989 | Tomlinson | 375/1 |
| 4,890,283 | 12/1989 | Tsinberg et al. | 375/1 |
| 4,907,087 | 3/1990 | Schreiber . | |
| 4,912,721 | 3/1990 | Pidgeon et al. | 375/1 |
| 5,073,899 | 12/1991 | Collier et al. | 375/1 |
| 5,127,021 | 6/1992 | Schreiber | 375/1 |

OTHER PUBLICATIONS

P. P. Vaidyanathan, "Quadrature Mirror Filter Banks, M-Band Extensions and Perfect-Reconstruction Techniques" IEEE ASSP Magazine, Jul. 1987, pp. 4–20.
G. K. Wallace, "Overview of the JPEG Still Picture Compression Algorithm", Digital Equipment Corporation pp. 66–71.
Schreiber, William F., U.S. Ser. No. 07/257,402, filed Oct. 13, 1988, entitled "Reliable Television Transmission Through Analog Channels".
Baylon, David Michael, "Adaptive Amplitude Modulation for Transform/Subband Coefficients", Massachusetts Institute of Technology, Jun. 1990, pp. 1–104.
Chou, Warren H., "Methods to Improve Spatiotempoal Adaptive Amplitude Modulation for Video Transmission", Massachusetts Institute of Technology, Feb. 1990, pp. 1–79.
Ziv, Jacob et al., "A Universal Algorithm for Sequential Data Compression", IEEE Transactions on Information Theory, vol. IT-23, No. 3, May 1977, pp. 337–343.
Haber, Conrad H. et al., "Analog Versus Digital Antijam Video Transmission", IEEE Transactions on Communications, vol. COM-25, No. 3, Mar. 1977, pp. 310–317.
ARPA Annual Technical Reports, "Image Transmission Via Spread Spectrum Techniques", Jan. 1978, pp. 1–411.
Pickholtz, Raymond L. et al., "Theory of Spread-Spectrum Communications-A Tutorial", IEEE Transactions on Communications, vol. Com-30, No. 5, May 1982, pp. 855–884.
Scholtz, Robert A., "The Spread Spectrum Concept", IEEE Transactions on Communications, vol. Com-25, No. 8, Aug. 1988, pp. 748–755.

*Primary Examiner*—David C. Cain
*Attorney, Agent, or Firm*—Fish & Richardson

[57] ABSTRACT

A 2-stage SS (spread-spectrum) system for transmitting a coded TV signal, said coded signal consisting of first components requiring near-perfect transmission and second components for which somewhat imperfect transmission is acceptable, wherein a first SS process is used to determine the relative SNR of the recovered said second components, wherein the output of said first SS process is added to said first components to form combined signals, wherein a second SS process operates on said combined signals and is used to nullify the effects of multipath in the transmission channel and/or establish a multistep threshold, wherein the output of said second stage is modulated on a carrier, and wherein a transmitter receives said modulated carrier and generates a transmission signal therefrom.

31 Claims, 7 Drawing Sheets

TELEVISION TRANSMISSION SYSTEM USING TWO STAGES OF SPEAD-SPECTRUM PROCESSING

BACKGROUND OF THE INVENTION

The invention relates to high definition television (HDTV) and to spread-spectrum (SS) communication systems.

In U.S. Pat. No. 5,127,021 (the '021 patent), incorporated herein by reference, a SS TV transmission system is described having certain advantages over known systems. These include the ability to establish the relative SNR of recovered components of different spatial frequency, the ability to optimize the quality of the reconstructed picture at each level of receiver CNR, and the ability to transmit more frequency components than would otherwise be possible within the allotted bandwidth by exchanging the total bandwidth of the components for SNR. (Note that the term CNR as used in this specification refers to carrier-to-noise ratio of radio-frequency signals, and the term SNR refers to the signal-to-noise ratio of input and output video signals.) Although it is a true SS system, the total bandwidth required to transmit a true HDTV image is no more than 6 MHz. This is the result of first dividing the original wideband signal into a large number of narrow-band streams, then spreading each such narrow-band stream to 6 MHz by direct-sequence SS, and finally adding up the coded and spread streams.

In addition to the problems of terrestrial broadcasting discussed in U.S. Pat. No. 5,127,021, reflections from buildings, mountains, and other objects nearly always give rise to echoes, evidenced in the received image as "ghosts" due to multipath transmission. Such ghosts are one of the main aspects of image degradation as seen at typical reception sites. Spread-spectrum transmission is a well known method of dealing with ghosts, although it has so far not been applied to TV since, in general, it is not permissible to expand the bandwidth as is done in conventional SS systems. The theory of SS ghost suppression is given in a paper by Turin. (G. L. Turin, "Introduction to Spread-Spectrum Antimultipath Techniques," Proc. IEEE, 68, 3, March, 1980, pp 328–353.)

SUMMARY OF THE INVENTION

The current invention is an improvement of the earlier invention. In accordance with the present invention, ghosts are suppressed by direct-sequence SS if the pseudorandom (pn) sequences that are used in generating the spread-spectrum signal are substantially longer than the temporal spread of the ghosts, and if the sequences have appropriate shifted cross-correlation coefficients. (Note that if the relative delay of a ghost were an integral multiple of the sequence length, it would not be attenuated at all.) In the current invention, SS is used for suppressing ghosts for the portion of the data that required near-perfect transmission in addition to the purposes described in the earlier invention of the '021 patent. The general idea of ghost suppression by SS is that the pn sequence length, which is also the symbol length of the narrow-band streams, must be longer than the time spread of the ghosts.

In general, in one aspect, the invention features a spread-spectrum transmission system for transmitting a television signal. The system includes a source coder dividing the television signal into a first stream of data and a second stream of data; and a channel coder connected to the source coder and producing an output signal. The channel coder includes a first stage processing the first stream of data to produce a first set of spread-spectrum signals therefrom; a combiner stage combining the first set of spread-spectrum signals with the second stream of data to produce a set of combined signals; and a second stage processing the set of combined signals to produce a second set of spread-spectrum signals therefrom. The output signal is derived from the second set of spread-spectrum signals.

Preferred embodiments include the following features. The television signal includes both a video signal and an audio signal. The first stream of data represents a portion of the television signal for which somewhat imperfect transmission is acceptable and the second stream of date represents another portion of the television signal for which nearly perfect transmission is required. Both the first and second sets of spread-spectrum signals include more than one member. The first stage includes means to divide the first stream of data into N components, where N is an integer greater than one, each of the N components comprising a sequence of symbols; means for multiplying each symbol of each of the N components by a different pseudorandom sequence to generate N product signals; means for weighting the N product signals; and means for adding the weighted product signals to generate the first set of spread-spectrum signals. Similarly, the second stage includes means to divide the combined stream into N components, where N is an integer greater than one, each of the N components comprising a sequence of symbols; means for multiplying each symbol of each of the N components by a different pseudorandom sequence to produce N product signals; means for weighting the N product signals; and means for adding the weighted product signals to generate the second spread-spectrum signal.

Also in preferred embodiments, the channel coder includes means for quantizing the second stream of data so as to generate quantized signals therefrom. The combiner combines the first set of spread-spectrum signals with said quantized signals to generate the set of combined signals. The combiner stage weights the first set of spread-spectrum signals prior to combining it with the quantized signals so that the maximum amplitude of the first set of quantized signals is less than the smallest distance between levels of the quantized signals. The channel coder also includes means for separating each of the first and second streams of data into high-priority and low-priority data streams. The first stage includes a section processing the high-priority portion of the first stream of data to produce a high-priority portion of the first set of spread-spectrum signals therefrom. The combiner stage combines the high-priority portion of the first set of spread-spectrum signals with the high-priority portion of the second stream of data to produce a high-priority portion of the set of combined signals. Similarly, the second stage includes a section processing the high-priority portion of the set of combined signals to produce a high-priority portion of the second set of spread-spectrum signals. The first stage also includes a section processing the low-priority portion of the first stream of data to produce a low-priority portion of the first set of spread-spectrum signals therefrom. The combiner stage combines the low-priority portion of the first set of spread-spectrum signals with the low-priority portion of the second stream of data to produce a low-priority portion of the set of combined signals. The second stage also includes a section processing the low-priority portion of the set of combined signals to produce a low-priority portion of the second set of spread-spectrum signals.

Further, in preferred embodiments, the second stage also includes means for weighting the high-priority portion of the second set of spread-spectrum signals; and an adder adding the weighted high-priority portion of the second set of spread-spectrum signals to the low-priority portion of the second set of spread-spectrum signals to produce the output signal of the channel coder. The weighting means multiplies the high-priority portion of the second set of spread-spectrum signals by a factor of w, where w is a positive number (e.g. 2). The high-priority processing section of the second stage includes means to divide the combined stream into N components, where N is an integer greater than one, each of the N components being a sequence of symbols; means for multiplying each symbol of each of the N components by a different pseudorandom sequence to produce N product signals; means for weighting the N product signals; and means for adding the weighted product signals to generate the second spread-spectrum signal. N is selected to be sufficiently large so as to ensure that the symbol length of each component is longer than the spread of multipath delay in the transmission channel.

Preferred embodiments further include the following features. The source coder includes scrambling means to scramble samples of components of the television signal before producing the first and second streams of data therefrom. The source coder also includes an adaptive modulation means for adaptively modulating the television signal before producing the first and second streams of data therefrom. In addition, the source coder includes an adaptive selection means for adaptively selecting samples of components of the television signal to produce the first and second streams of data therefrom. The spread-spectrum system further includes a transmitter receiving the output signal from the channel coder and generating a transmission signal therefrom.

In general, in another aspect, the invention is a spread-spectrum television receiver for receiving a transmission signal that was derived from a television production signal. The receiver includes a first direct sequence decoder processing a received television transmission signal to generate a set of hybrid signals; a quantizer quantizing members of a set of signals derived from the set of hybrid signals to produce a set of quantized signals; means for subtracting the set of quantized signals from the set of hybrid signals to produce a first set of analog signals; a second direct sequence decoder processing the set of first analog signals to generate a second set of analog signals; and means for reconstructing the television production signal from the second set of analog signals and the set of quantized signals.

Preferred embodiments include the following features. The receiver also includes an NxN linear matrix means for removing crosstalk from said hybrid signals and thereby generate said set of derived signals, where N is the number of signals in the set of hybrid signals. The first direct sequence decoder includes a pseudorandom sequence generator generating a set of pseudorandom sequences; and means for multiplying the received signal by each member of the set of pseudorandom sequences to generate the set of hybrid signals. The second direct sequence decoder includes a pseudorandom sequence generator generating a set of pseudorandom sequences; and means for multiplying the first set of analog signals by each member of the set of pseudorandom sequences to generate the second set of analog signals.

In general, in yet another aspect, the invention is a spread-spectrum television receiver for receiving a transmission signal that was derived from a television production signal. The receiver includes a direct sequence decoder processing a received television transmission signal to generate a set of hybrid signals; an N×N linear matrix means for removing crosstalk from said hybrid signals and thereby generate the set of derived signals, where N is the number of signals in the set of hybrid signals; a quantizer quantizing members of a set of signals derived from the set of hybrid signals to produce a set of quantized signals; means for subtracting the set of quantized signals from the set of hybrid signals to produce a set of analog signals; and means for reconstructing the television production signal from the set of analog signals and the set of quantized signals.

The invention substantially reduces the effect of multipath distortion in the transmission channel without the use of conventional automatic channel equalizers. It permits the establishment of a series of graded thresholds of CNR, so that, at each higher level of CNR, improved picture quality is obtained. This permits extending the geographical area within which some service is preserved, albeit at lower picture quality, and also permits improved quality at higher CNR, both as compared to systems that attempt to deliver the same amount of data to all receivers within the viewing area. The invention permits the partition of the data from which a TV signal is to be reconstructed at a receiver into multiple streams requiring different transmission accuracy. These streams are then modulated using SS methods so that all the data is protected from multipath and the various streams have relative noise protection appropriate to their importance to the final reconstructed image quality.

In addition, the invention permits the precise cancellation of crosstalk in any spread-spectrum multiplexing system in which the number of components is equal to or less than the length of the pseudorandom sequences used for coding, even if the sequences are not exactly orthogonal. Another advantage of the invention is that preprocessing to reduce the information content of the data applied to the apparatus of the invention, such as motion-compensated prediction, may be used to increase the received picture quality for a given channel capacity. Also, the invention permits efficient transmission of video information generated by source coders in digital, analog, or hybrid form.

DESCRIPTION OF THE PREFERRED EMBODIMENT(S)

Figure 1:
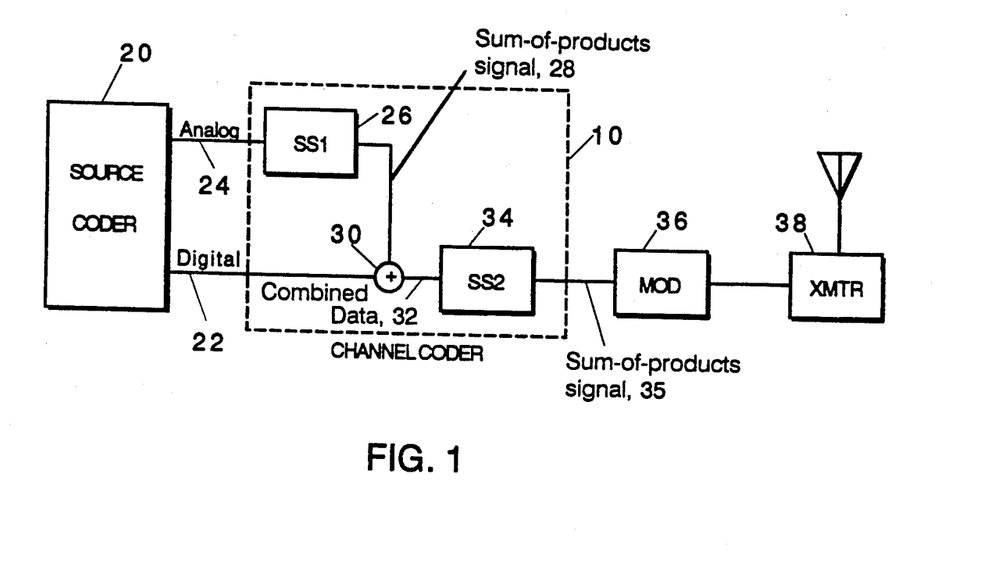
FIG. 1 shows the basic idea of the 2-stage SS processing.

FIG. 1 shows the basic idea of 2-stage SS processing in channel coder 10. This processing can be applied to the output of any source coder 20 that separates the data to be transmitted into one category (usually in digital form, referred to hereinafter as digital data 22) that must be transmitted nearly error-free and another category (which can be in digital or analog form, referred to hereinafter as analog data 24) in which some errors and/or noise are tolerable. A first SS operation 26, identical to that disclosed in the '021 Patent, is applied to analog data 24, producing a sum-of-products signal 28 that appears to be a random string of values. This sum-of-products signal 28 is added in an adder 30 to digital data 22, producing a stream of combined data 32, which is then subjected to a second SS operation 34 to produce a second sum-of-products signal 35. The function of the first SS operation 26 is to establish the relative SNR of the various components in analog data 24 and to permit the transmission of more than the expected number of samples, according to the procedures of the '021 patent. The function of the second SS operation 34 is to suppress multipath and to establish stepped thresholds, as will be described in more detail shortly. The output of channel coder 10 is applied to a modulator 36 and then to transmitter 38.

Figure 2A:
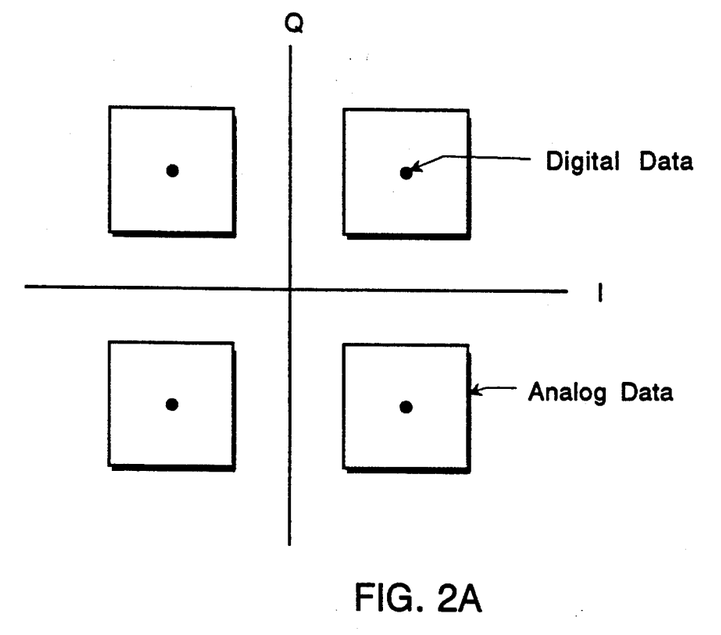
FIG. 2a is a hybrid transmission constellation.
Figure 2B:
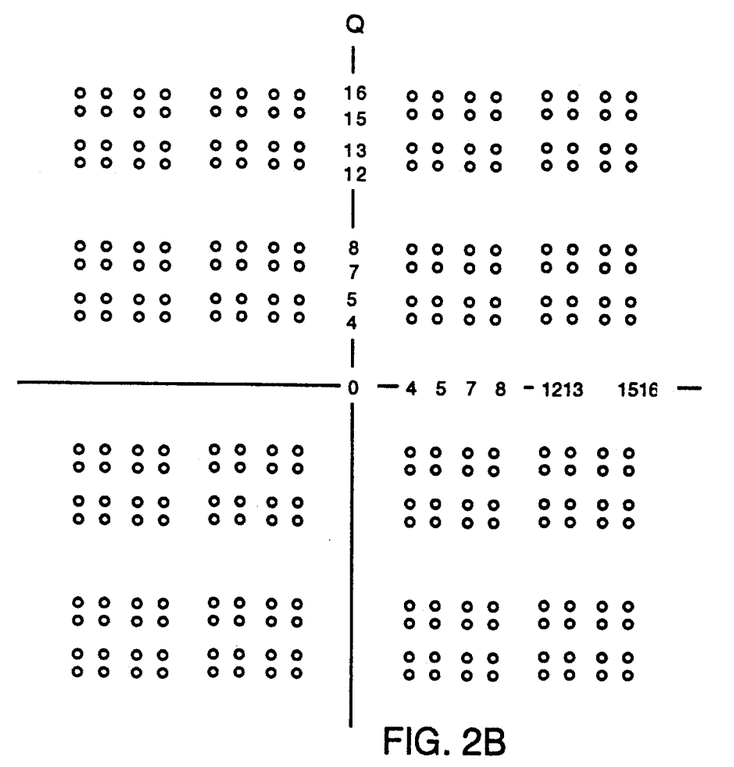
FIG. 2b is a 256-QAM signal constellation with nonuniform levels.

If the "analog data" is actually in analog form, then the combined signal is a hybrid analog-digital signal as in FIG. 2a. If the "analog data" is actually in multilevel digital form, then the combined signal is a nonuniform-level signal as in FIG. 2b. In either case, the recovery of the "digital data" at the receiver is possible at a substantially lower CNR than the recovery of the "analog data".

Figure 3:
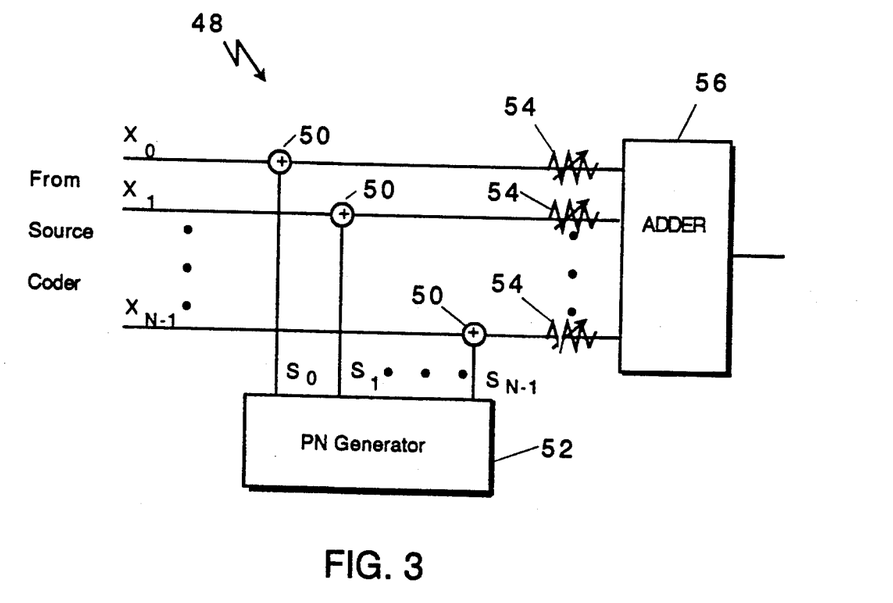
FIG. 3 is a direct-sequence encoder as used in the invention.

The first SS operation is performed as follows. Assume that the source coder produces m highs components or sampled data streams. Referring to FIG. 3, a direct-sequence encoder (DSE) 48 processes the m highs components or sample data streams, $x_0$ through $x_{N-1}$, that are produced by source coder 20. Each train o samples, $x_i$, passes to an associated multiplier 50 where it is multiplied by a different unique one of a group of pseudorandom sequences, $\{PN_i\}$, generated by a PNG generator 52. Each pseudorandom sequence $N_i$ is of length N (where N is the number of signals or pulses in the signal), is a member of a set of orthogonal sequences, and has a clock rate that is twice the channel bandwidth in Hz. (Note that there are exactly N orthogonal sequences of length N.) Multiplying each signal sample by a pseudorandom sequence spreads the signal to the full channel bandwidth.

The output of each multiplier 50 passes to a weighting circuit 54 that multiplies the product by an appropriate weight. In other words, the products (i.e., the outputs of multipliers 50) are assigned different power levels, generally with higher power being used for lower-frequency components. The weighting process is symbolized here by adjustable resistors, but any appropriate means may be used to achieve the desired weighting. The weighted signals are then combined in an adder 56 to produce a weighted sum-of-products signal (i.e., sum-of-products signal 28 shown in FIG. 1) which is then combined with the digital signal 22.

Figure 4A:
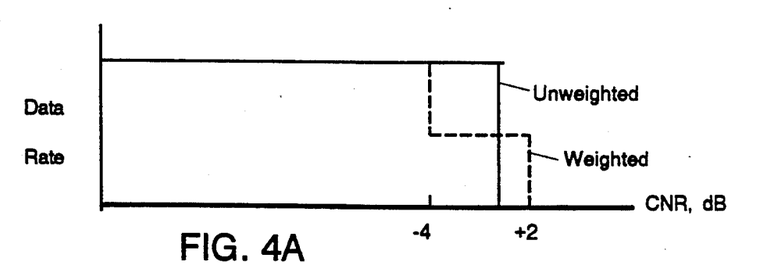
FIGS. 4a and b show the effect of weighting the components in an SS encoder so as to achieve a different threshold for each component.
Figure 4B:
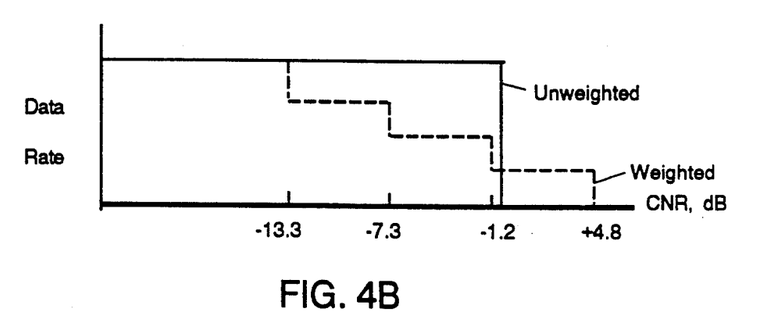

By appropriately weighting the signals in the second SS operation before combining them to create the second sum-of-products signal, the performance of the system can be improved FIGS. 4a-b show how weighting the components in the second SS operation results in a stepped threshold. Since the SNR of each component after demodulation is proportional to the signal level at the addition stage in the encoder, the result of weighting is to produce a different SNR for each recovered component. If these components have a threshold SNR (as they would if they were digital signals transmitted by QAM, for example) then various components are recovered at various receiver CNR. In FIG. 4a, where half the components are added with twice the amplitude as the other half, then these half are recovered at 2 dB lower CNR and the other half at 4 dB higher CNR than would be the case with equal weighting. FIG. 4b shows the result of separating the components into 4 streams, again with twice the weighting for each stream as for the next stream. In this case, ¼ of the entire data is recovered at a CNR 4.8 dB lower than if there were no weighting.

Figure 5:
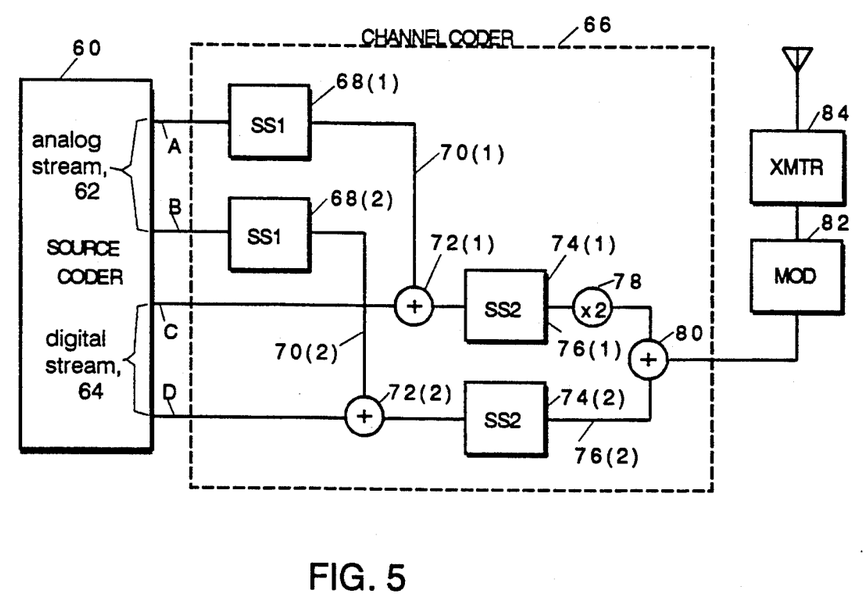
FIG. 5 illustrates the addition of two priority levels to the 2-stage scheme of FIG. 1.

Referring to FIG. 5, a source coder 60 produces an analog data stream 62 and a digital data stream 64, as described earlier. In this case, however, source coder 60 separates analog data stream 62 into high-priority stream A and low-priority stream B, and similarly, it separates digital data stream 64 into high-priority stream C and low-priority stream D. A channel coder 66 then separately processes the high-priority information and the low-priority information in the manner described previously.

More specifically, within channel coder 66, a SS operation 68(1) processes the high-priority analog data stream (i.e., stream A) to produce a spread spectrum signal 70(1). An adder 72(1) combines spread spectrum signal 70(1) with the high-priority digital data stream (i.e., stream C) to produce a combined signal which is then processed by a second SS operation 74(1). Operating on the combined signal from adder 72(1), the second SS operation 74(1) produces a final spread-spectrum signal 76(1) containing the high-priority information. In a similar way, the low-priority analog data stream is combined with the low-priority digital data stream to produce a final spread-spectrum signal 76(2) containing the low-priority information.

A multiplier 78 then weights the high-priority spread-spectrum signal 76(1) and an adder 80 combines the weighted signal with the low-priority spread-spectrum signal 76(2) to generate the output signal for channel coder 66. As before the output signal passes first to a modulator 82 and then to a transmitter 84.

In this illustrated example, a weighting of 2:1 is used, which means that the more heavily weighted signal is received at a CNR 6 dB higher than that of the less heavily weighted signal. The result is a 3-step threshold. At the lowest useable CNR, half the digital data C is recovered. For a CNR 6 dB higher, all the digital data (C and D) and half the analog data (A) is recovered. At a CNR still 6 dB higher, all the digital data and all the analog data (A and B) is recovered. As the CNR goes higher and higher, the SNR of the analog data rises in proportion.

Figure 6:
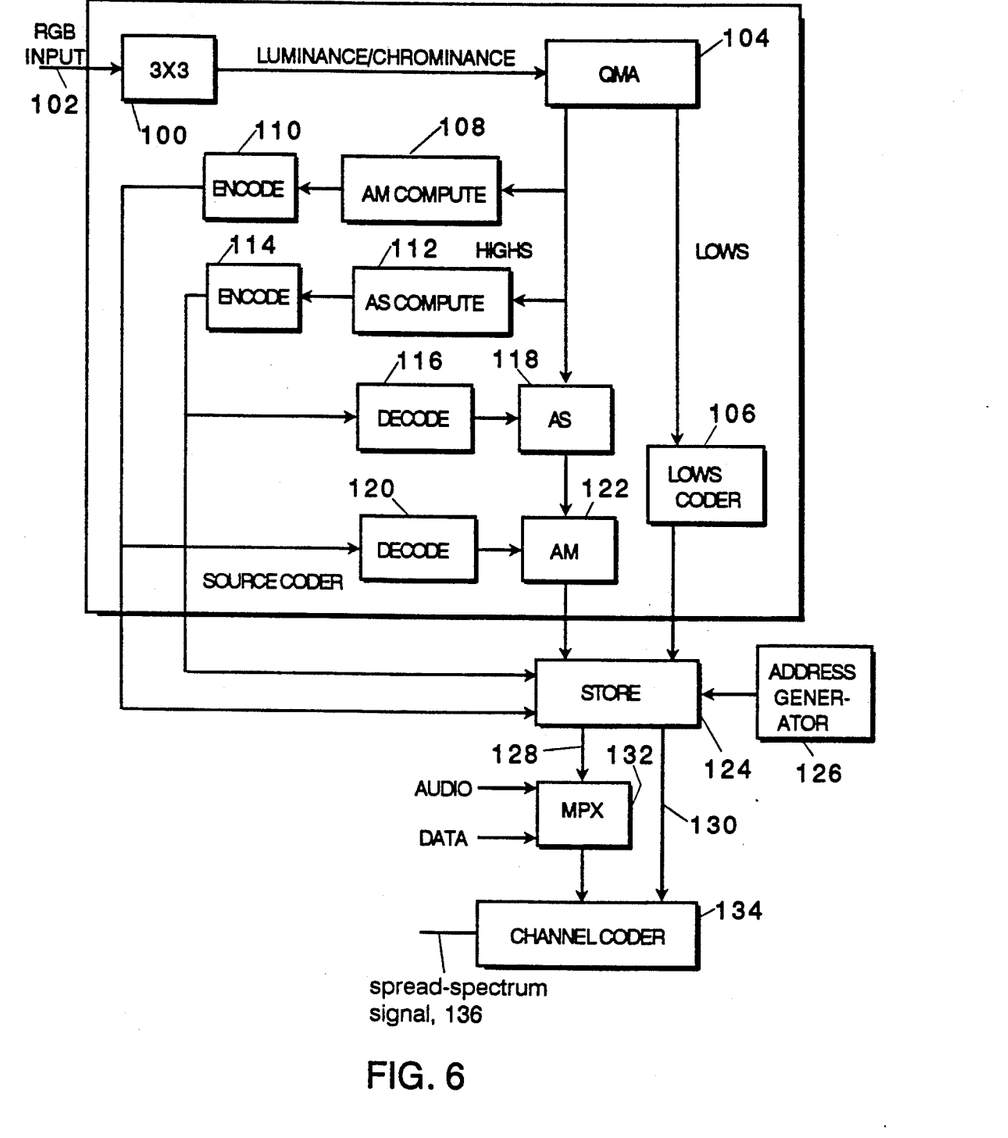
FIG. 6 is a block diagram of the spread-spectrum version of the MIT-CC system.
Figure 7:
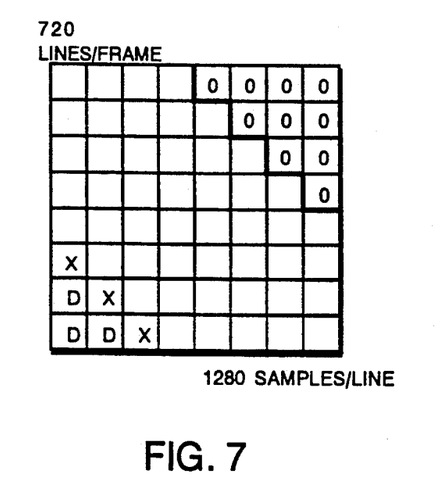
FIG. 7 illustrates an 8×8 decomposition of the television signal in the spatial frequency plane.

To gain full advantage of this transmission scheme, an appropriate source-coding method should be used; for example, the MIT-CC system such as is illustrated in FIG. 6. In a spread spectrum version of the MIT-CC system, a 3×3 linear matrix 100 processes an RGB high-definition video signal 102 to generate the standard luminance/chrominance form. A quadrature-mirror analysis filter bank 104 uses two-dimensional subband decomposition to divide the spectrum of each video frame into 8×8 (i.e., 64) frequency components, each having dimensions 90×160 pels (see FIG. 7). The lowest frequency components, which are identified by the letter "D" in FIG. 7 are sent error-free at full resolution. That is, they are processed by a lows coder 106 into a digital signal at 4 Mb/s (Megabits per second), while the other components are treated separately. Optionally, a forward error correcting code (FEC) may be used on the lows signal.

In the described embodiment, the highest ten frequency components are discarded (i.e., not sent). The remaining blocks, numbering 51 components represent the highs signal corresponding to analog signal data stream 24 in FIG. 1.

There are two methods of dealing with the fact that different SNR is required for different samples, according to their frequency. For example, the number of bits/sample may be preassigned to each frequency. Alternatively, an adaptive modulation (AM) process may be used in which the smaller samples are multiplied by larger adaptation factors. To minimize the quantity of side information, each transmitted adaptation factor is used for many samples. At the receiver, each received sample is divided by the appropriate adaptation factor to restore the sample to approximately its original amplitude. The division process also reduces any noise or interference added in the channel. Either method can be used with the invention.

Experience demonstrates that with high-definition TV systems, only about ⅛ or less of all the samples are needed for intraframe coding. Thus, adaptive selection of only these most important samples may be used. Of course, when samples are adaptively selected, their location in the frequency plane or the space plane (both methods are used) must be indicated to the receiver. Such information (referred to as AS data) must be delivered essentially without error, whereas the sample amplitude can suffer small errors without catastrophic effect on the reconstructed image.

In the described embodiment, improved noise performance is achieved by adaptive modulation, and data compression is achieved by adaptive selection of about 10 Ms/s (Megasamples per second) of subband samples out of the 55.2 Ms/s in the original signal An AM compute module 108 computes the adaptive modulation factors to be applied to the image frame and an AM encoder 110 encodes the AM factors. Similarly, an AS compute module 112 computes the adaptive selection information and an AS encoder 114 encodes the adaptive selection decisions. (The AM and the AS data are each coded to about 2 Mb/s, using the techniques described in the '021 patent.)

Since some distortion occurs in the coding of these two data streams, they are decoded at the sending end exactly as they are to be decoded at the receiving end, and the reconstructed AM and AS data is used to process the video information by applying both the adaptive modulation factors and the adaptive selection decisions generated for the image. As shown in FIG. 6, an AS decoder 106 decodes the coded adaptive selection information from AS encoder 114 and an AS circuit 118 implements the adaptive selection decisions on the image data. Similarly, an AM decoder 120 decodes the coded adaptive modulation from AM encoder 110 and an AM circuit 122 processes the image data by applying the adaptive modulation factors to the image data. Ultimately, all of the data (i.e., the encoded AM data from AM encoder 110, the encoded AS data from AS encoder 114, the lows data from lows coder 106, and the modified highs data from AM circuit 122) are placed in a store 124 under the control of an address generator 126.

As an optional feature, address generator 126 may implement a scrambling function in accordance with the principles described in U.S. Pat. No. 5,040,211, entitled "Reliable Television Transmission Through Analog Channels" issued Aug. 13, 1991, and incorporated herein by reference. The scrambling pattern must be known at the receiver, but it need not be transmitted with each image as it does not vary with each image.

Since only 10 to 12% of the samples are sufficient to give very good quality, the minimum required data rate is about 5 to 6 Ms/s, leaving analog capacity to spare. This extra capacity is used to reduce the amount of digital data required to specify the selected samples. Of the approximately 10 Mb/s of digital transmission capacity available, approximately 2 Mb/s each are used for adaptive selection and adaptive modulation, and approximately 4 Mb/s is available for RGB lows. The remaining 2 Mb/s sec is for audio, error correction, and ancillary data.

Data is read from store 124 under control of address generator 126 to generate two streams of samples, one stream of samples (identified as stream 128) containing the lows information and the other stream of samples (identified as stream 130) containing the highs information. The lows information is multiplexed in a multiplexer (MPX) 132 with audio and ancillary data plus forward error correction (FEC) information, if used. Then, the signal from MPX 132 along with the highs information passes to a channel coder 134 where it is processed using the previously described spread spectrum techniques to produce a spread-spectrum signal 136.

For use with the current invention, the digital data is separated into two 5-Mbits/sec streams. The higher-priority digital stream includes RGB lows, audio, and associated error-correction data, while the higher-priority analog data comprises samples of the lower-frequency components (of the highs as a group). Thus, at the lowest useable CNR, only a low-resolution RGB image is recovered. At a 6-dB higher CNR, half of the highs samples are also recovered, together with the digital data needed for their decoding, producing a medium-resolution picture. At 6 dB higher than that, all the data is recovered, producing a full-resolution picture. At still higher CNR, the SNR of the picture improves.

Figure 8:
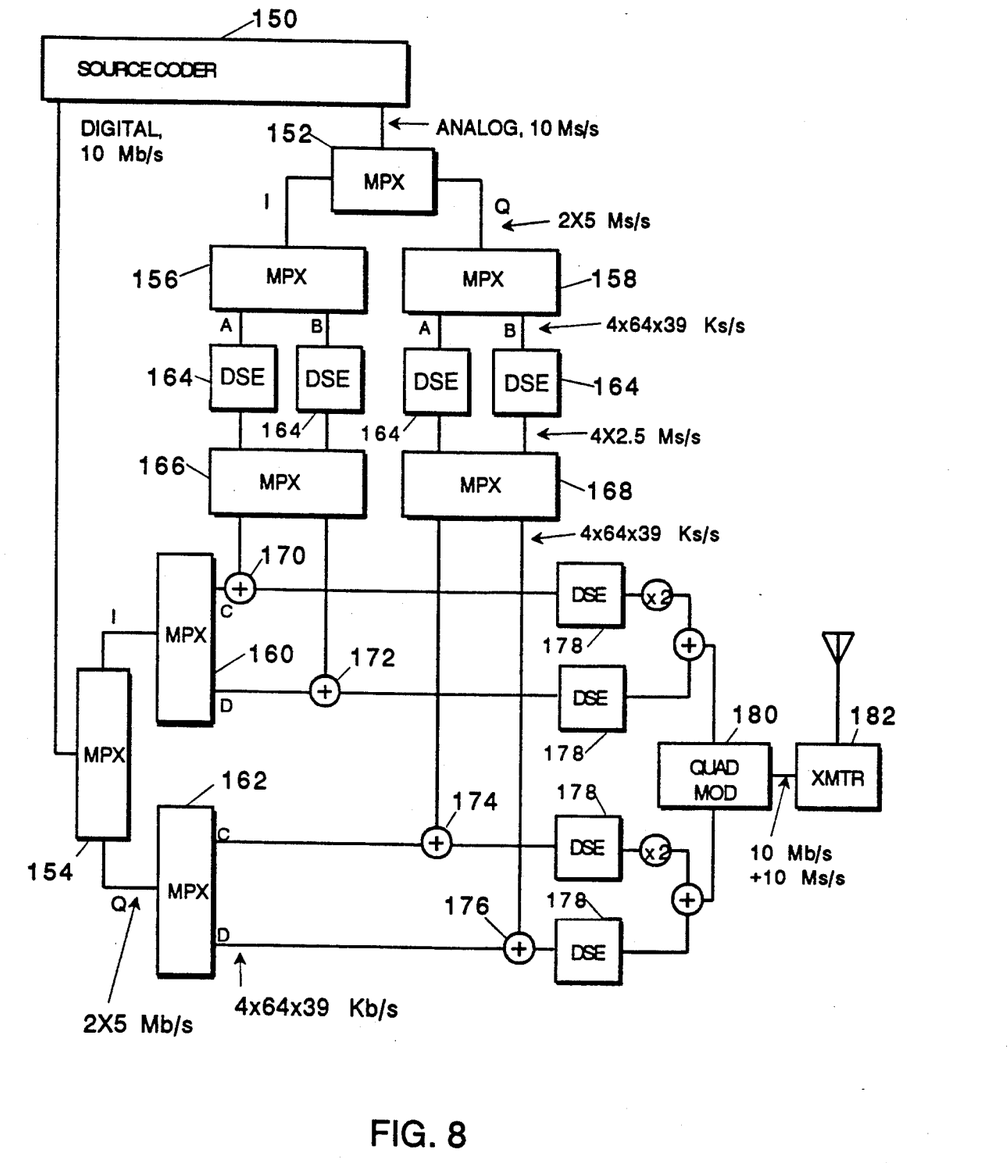
FIG. 8 shows a complete encoder for transmitting an HDTV signal in a 6-MHz channel.

FIG. 8 is a block diagram of a preferred embodiment of the invention as configured for the transmission of an HDTV signal in a 6-MHz channel, using a source coding method such as that of the MIT-CC system described above and using quadrature amplitude modulation (QAM). For the suppression of ghosts with a time spread of 25 microseconds or less, the symbol length of the narrow-band streams must be 25 microseconds or more, so that the data rate in each can be no more than 40 KHz. We therefore use 256 narrow-band streams, each of 39 KHz, for a total rate of 10 million hybrid symbols/sec. Since we need high- and low-priority signals for the I (in-phase) and Q (out-of-phase) channels, we need four data streams, each comprising 64 narrow-band streams.

As shown in FIG. 8, both the analog and digital data from a source coder 150 are first separated by multiplexers 152 and 154 into I and Q streams having similar properties. Each of these four streams is then further separated into high-priority (A and C) and low-priority (B and D) data by multiplexers 156, 158, 160, and 162, each consisting of 64 streams at 39 Kilobits or Kilosamples per sec, respectively.

The four streams of analog data are then applied to direct-sequence encoders (DSEs 164), giving four streams of data, each of 2.5 Megasamples/sec. (Each DSE 164 has 64 inputs and 1 output.) Each of these is separated into 64 streams at 39 KHz by multiplexers 166 and 168 and added to the digital data by adders 170, 172, 174, and 176 to produce four groups of hybrid data, each group consisting of 64 streams at 39,000 hybrid symbols/sec. The four groups are applied to four DSEs 178. The four resulting signals are weighted and added as shown and applied to a quadrature modulator 180 and then to a transmitter 182.

Figure 9:
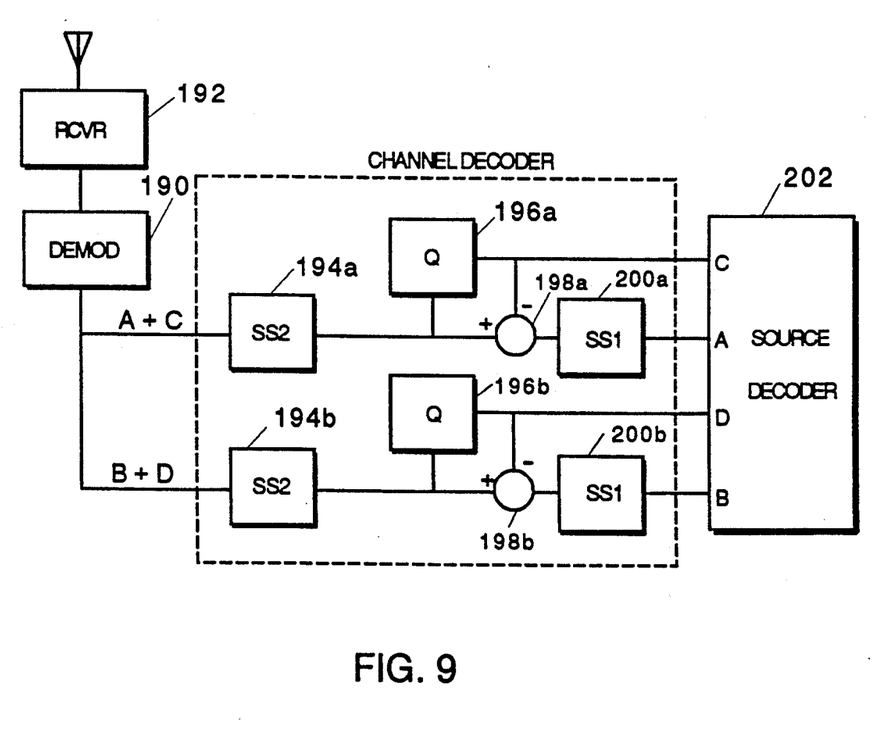
FIG. 9 shows a decoder corresponding to the encoder of FIG. 3.

The decoder implements the inverse of the operations of the encoder and is, for the most part, obvious to those skilled in the art. A preferred method of separating the hybrid data into its analog and digital parts is shown in FIG. 9, which is at the same level of detail as FIG. 5. A quadrature demodulator 190 receives the signal from receiver 192 and outputs the low-priority (B+D) and high-priority (A+C) signals in their second SS-processed form, and direct-sequence decoders (DSDs 194a and 194b) each produce the 10 million hybrid signal samples/sec. These signals are then quantized to produce the multilevel digital data using quantizers 196a and 196b identical to those at the encoder. The quantized output is subtracted in subtractors 198a and 198b from the hybrid data to produce the analog data, which is then applied to DSDs 200a and 200b for first SS processing. Both analog and digital data, at 10 Megabits or Megasamples/sec, respectively, are input to a source decoder 202.

Figure 10:
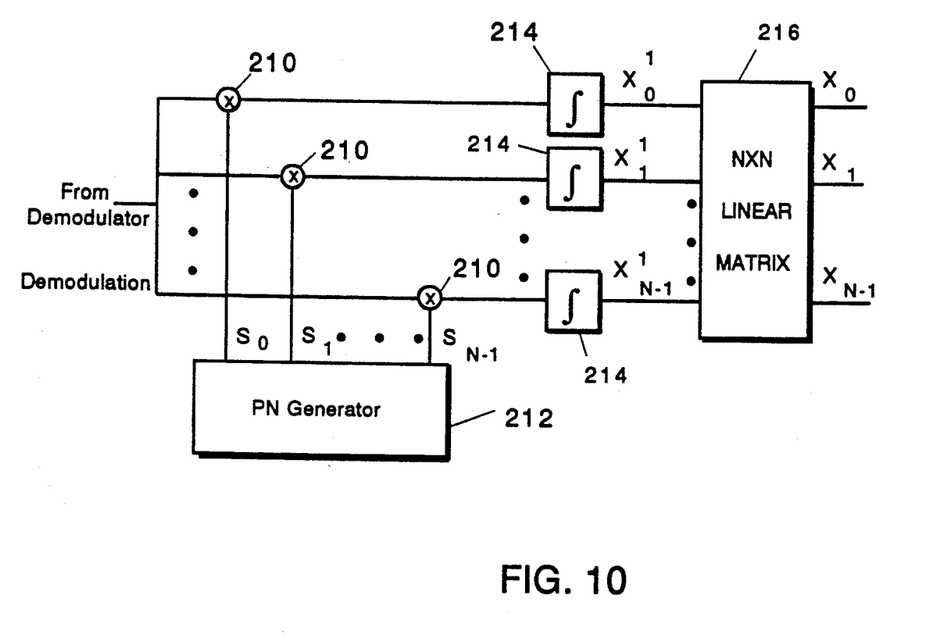
FIG. 10 is a block diagram of a direct-sequence decoder such as is used in the invention.

Referring to FIG. 10, in the described embodiment, direct-sequence decoder (DSD) 194a (and 194b) processes the output of demodulator 190 to generate the m frequency components that were sent. The output of demodulator 190 including the sum-of-products signal is input to m multipliers 210, one for each of the frequency components which is to be extracted from the received signal. A pseudorandom sequence generator 212 generates the m different pseudorandom sequences $\{PN_i\}$ that were used in DSE 48 (see FIG. 3) and supplies these to multipliers 210 so that the demodulated signal is multiplied by a different one of the pseudorandom sequences. Each of the resulting product signals is then integrated by integrators 214 for a period equal to one pseudorandom sequence length. Each integrator 214 applies a weight that is the reciprocal of the Weight applied by weighting circuits 54 in DSE 48. Thus, to the degree that the sequences are orthogonal, each multiplier 210 plus integrator 214 combination picks out one of the original trains of samples from the demodulated signal, producing signal $x'_i$, which is a replica of the corresponding signal $x_i$ at the encoder, but with the addition of some noise.

The set of signals $\{x_i\}$ are then processed by an N×N linear matrix 216. This matrix has the function of removing the crosstalk perfectly when N or fewer different sequences of length N are used. In that case, the cross-correlation matrix of the sequences is known and the inverse NxN matrix can be found. NxN linear matrix 216 implements the inverse of that cross-correlation matrix. It should be noted that, although it is possible to find N orthogonal sequences of length N, thus producing no crosstalk, it may be preferable to use imperfectly orthogonal sequences in order to get better shifted-sequence cross-correlation performance. For more information on pseudorandom sequences see D. V. Sarwate et al., "Cross-correlation Properties of Pseudorandom and Related Sequences," Proceedings IEEE, Vol. 68, No. 5, May, 1980, pp 593ff.

Certain details common to the '021 patent have not been described herein, such as sample-control methods, synchronization, scrambling, adaptive modulation, and adaptive selection. These are fully disclosed in the '021 patent. It is understood that the combination of any aspect of the 2-stage SS channel-coding method with any of the features of the '021 patent or of the MIT-CC system is anticipated by this disclosure.

Many variants of the invention are possible. The data may be preprocessed to reduce its information content relative to the original picture quality, such as by motion-compensated prediction. As long as the source coder output consists of data to be transmitted error-free plus other data that can suffer some noise or errors in transmission without catastrophic effect on picture quality, the 2-stage ss channel coding method can be used. Any number of priority levels can be used by appropriate weighting before adding in the DSEs. A modulation method other than QAM can be used (such as PSK) and QAM, if used, can be implemented differently.

Other embodiments are within the following claims. For example, it should be readily apparent to a person skilled in the art that many of the functions that were described above can be implemented either in software or hardware. Thus, the following claims cover both software and hardware implementations.

What is claimed is:

1. A spread-spectrum transmission system for transmitting a television signal, said system comprising:
   a source coder dividing the television signal into a first stream of data and a second stream of data; and
   a channel coder connected to said source coder and producing an output signal, said channel coder comprising:
   a first stage processing said first stream of data to produce a first set of spread-spectrum signals therefrom;
   a combiner stage combining said first set of spread-spectrum signals with said second stream of data to produce a set of combined signals; and
   a second stage processing said set of combined signals to produce a second set of spread-spectrum signals therefrom, wherein said output signal is derived from said second set of spread-spectrum signals.

2. The spread-spectrum system of claim 1 wherein said television signal comprises a video signal and an audio signal.

3. The spread-spectrum system of claim 1 wherein said first stream of data represents a portion of the television signal for which somewhat imperfect transmission is acceptable and said second stream of date represents another portion of the television signal for which nearly perfect transmission is required.

4. The spread-spectrum system of claim 1 wherein said first set of spread-spectrum signals includes more than one member.

5. The spread-spectrum system of claim 1 wherein said second set of spread-spectrum signals includes more than one member.

6. The spread-spectrum system of claim 1 wherein said first stage comprises:
   means to divide said first stream of data into N components, where N is an integer greater than one, each of said N components comprising a sequence of symbols;
   means for multiplying each symbol of each of said N components by a different pseudorandom sequence to generate N product signals;
   means for weighting the N product signals; and
   means for adding the weighted product signals to generate the first set of spread-spectrum signals.

7. The spread-spectrum system of claim 1 wherein said channel coder further comprises means for quantizing said second stream of data so as to generate quantized signals therefrom, and wherein said combiner stage combines said first set of spread-spectrum signals with said quantized signals to generate said set of combined signals.

8. The spread-spectrum system of claim 1 wherein said combiner stage weights said first set of spread-spectrum signals prior to combining it with the quantized signals so that the maximum amplitude of said first set of quantized signals is less than the smallest distance between levels of the quantized signals.

9. The spread-spectrum system of claim 1 wherein said second stage comprises:
   means to divide said combined stream into N components, where N is an integer greater than one, each of said N components comprising a sequence of symbols;
   means for multiplying each symbol of each of said N components by a different pseudorandom sequence to produce N product signals;
   means for weighting the N product signals; and
   means for adding the weighted product signals to generate the second spread-spectrum signal.

10. The spread-spectrum system of claim 1 wherein said channel coder further comprises means for separating each of said first and second streams of data into high-priority and low-priority data streams.

11. The spread-spectrum system of claim 10 wherein said first stage comprises a section processing the high-priority portion of said first stream of data to produce a high-priority portion of said first set of spread-spectrum signals therefrom; wherein said combiner stage combines said high-priority portion of said first set of spread-spectrum signals with the high-priority portion of said second stream of data to produce a high-priority portion of said set of combined signals.

12. The spread-spectrum system of claim 1 wherein said second stage comprises a section processing the high-priority portion of said set of combined signals to produce a high-priority portion of said second set of spread-spectrum signals.

13. The spread-spectrum system of claim 1 wherein said first stage comprises a section processing the low-priority portion of said first stream of data to produce a low-priority portion of said first set of spread-spectrum signals therefrom; wherein said combiner stage combines said low-priority portion of said first set of spread-spectrum signals with the low-priority portion of said second stream of data to produce a low-priority portion of said set of combined signals.

14. The spread-spectrum system of claim 1 wherein said second stage comprises a section processing the low-priority portion of said set of combined signals to produce a low-priority portion of said second set of spread-spectrum signals.

15. The spread-spectrum system of claim 1 wherein said second stage further comprises:
   means for weighting the high-priority portion of said second set of spread-spectrum signals; and
   an adder adding the weighted high-priority portion of said second set of spread-spectrum signals to the low-priority portion of said second set of spread-spectrum signals to produce the output signal of said channel coder.

16. The spread-spectrum system of claim 1 wherein said weighting means multiplies the high-priority portion of said second set of spread-spectrum signals by a factor of w, where w is a positive number.

17. The spread-spectrum system of claim 1 wherein w is two.

18. The spread-spectrum system of claim 12 wherein the high-priority processing section of said second stage comprises:
   means to divide said combined stream into N components, where N is an integer greater than one, each of said N components comprising a sequence of symbols;
   means for multiplying each symbol of each of said N components by a different pseudorandom sequence to produce N product signals;
   means for weighting the N product signals; and
   means for adding the weighted product signals to generate the second spread-spectrum signal.

19. The spread-spectrum system of claim 18 wherein N is selected to be sufficiently large so as to ensure that the symbol length of each component is longer than the spread of multipath delay in the transmission channel.

20. The spread-spectrum system of claim 1 wherein said source coder comprises scrambling means to scramble samples of components of said television signal before producing the first and second streams of data therefrom.

21. The spread-spectrum system of claim 1 wherein said source coder comprises an adaptive modulation means for adaptively modulating the components of the television signal before producing the first and second streams of data therefrom.

22. The spread-spectrum system of claim 1 wherein said source coder comprises an adaptive selection means for adaptively selecting samples of components of the television signal to produce the first and second streams of data therefrom.

23. The spread-spectrum system of claim 1 wherein said source coder comprises an adaptive selection means for adaptively selecting samples of components of the television signal and an adaptive modulation means for adaptively modulating the adaptively selected samples of components of the television signal prior to producing the first and second streams of data therefrom.

24. The spread-spectrum system of claim 1 further comprising a transmitter receiving the output signal from the channel coder and generating a transmission signal therefrom.

25. A spread-spectrum television receiver for receiving a transmission signal that was derived from a television production signal, said receiver comprising:
- a first direct sequence decoder processing a received television transmission signal to generate a set of hybrid signals;
- a quantizer quantizing members of a set of signals derived from said set of hybrid signals to produce a set of quantized signals;
- means for subtracting said set of quantized signals from said set of hybrid signals to produce a first set of analog signals;
- a second direct sequence decoder processing said set of first analog signals to generate a second set of analog signals; and
- means for reconstructing the television production signal from said second set of analog signals and said set of quantized signals.

26. The spread-spectrum television receiver of claim 25 further comprising an N×N linear matrix means for removing crosstalk from said hybrid signals and thereby generate said set of derived signals, where N is the number of signals in the set of hybrid signals.

27. The spread-spectrum television receiver of claim 25 wherein said first direct sequence decoder comprises:
- a pseudorandom sequence generator generating a set of pseudorandom sequences; and
- means for multiplying said received television transmission signal by each member of the set of pseudorandom sequences to generate a set of intermediate signals from which said set of hybrid signals are derived.

28. The spread-spectrum television receiver of claim 25 wherein said second direct sequence decoder comprises:
- a pseudorandom sequence generator generating a set of pseudorandom sequences; and
- means for multiplying said first set of analog signals by each member of the set of pseudorandom sequences to generate a set of intermediate signals from which said second set of analog signals are derived.

29. A spread-spectrum television receiver for receiving a transmission signal that was derived from a television production signal, said receiver comprising:
- a direct sequence decoder processing a received television transmission signal to generate a set of hybrid signals;
- an N×N linear matrix means for removing crosstalk from said hybrid signals and thereby generate a set of derived signals, where N is the number of signals in the set of hybrid signals;
- a quantizer quantizing members of said set of derived signals to produce a set of quantized signals;
- means for subtracting said set of quantized signals from said set of hybrid signals to produce a set of analog signals; and
- means for reconstructing the television production signal from said set of analog signals and said set of quantized signals.

30. The spread-spectrum television receiver of claim 27 wherein said first direct sequence decoder further comprises integrators that integrate each of the intermediate signals of said set of intermediate signals to produce said set of hybrid signals.

31. The spread-spectrum television receiver of claim 28 wherein said second direct sequence decoder further comprises integrators that integrate each of the intermediate signals of said set of intermediate signals to produce said second set of analog signals.

* * * * *

UNITED STATES PATENT AND TRADEMARK OFFICE
CERTIFICATE OF CORRECTION

PATENT NO.   : 5,311,543
DATED        : May 10, 1994
INVENTOR(S)  : William F. Schreiber It is certified that error appears in the above-indentified patent and that said Letters Patent is hereby corrected as shown below:

Column 5, line 55, "oi" should be -- of --
Column 6, line 13, insert --.-- after "improved"--
Column 9, line 65, "Weight" should be --weight--

Signed and Sealed this

Second Day of January, 1996

Attest:

BRUCE LEHMAN

Attesting Officer          Commissioner of Patents and Trademarks